US012604910B2

(12) United States Patent (10) Patent No.: US 12,604,910 B2
Sreeram (45) Date of Patent: Apr. 21, 2026

(54) TARGETING FOR VACUUM-BASED ENGAGEMENT TOOLS

(71) Applicant: Cryovac, LLC, Charlotte, NC (US)

(72) Inventor: Siddarth Sreeram, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 306 days.

(21) Appl. No.: 18/017,871

(22) PCT Filed: Jul. 9, 2021

(86) PCT No.: PCT/US2021/040991
§ 371 (c)(1),
(2) Date: Jan. 25, 2023

(87) PCT Pub. No.: WO2022/026153
PCT Pub. Date: Feb. 3, 2022

(65) Prior Publication Data
US 2023/0270126 A1 Aug. 31, 2023

Related U.S. Application Data

(60) Provisional application No. 63/056,774, filed on Jul. 27, 2020.

(51) Int. Cl.
*A22C 17/00* (2006.01)
*B25J 9/00* (2006.01)
(Continued)

(52) U.S. Cl.
CPC ...... *A22C 17/0093* (2013.01); *A22C 17/0073* (2013.01); *B25J 9/0093* (2013.01);
(Continued)

(58) Field of Classification Search
CPC ............. A22C 17/0093; A22C 17/0073; B25J 9/0093; B25J 9/1697; B25J 11/0045;
(Continued)

(56) References Cited

U.S. PATENT DOCUMENTS 6,891,961 B2 * 5/2005 Eger ...................... A22B 5/007
382/199
7,860,277 B2 * 12/2010 Mulder ................. B07C 5/3422
382/110
(Continued)

FOREIGN PATENT DOCUMENTS

WO 2019232113 A1 12/2019
WO 2019241114 A1 12/2019
(Continued)

OTHER PUBLICATIONS

Aaron Saenz, Super Fast FANUC Robot Sorts Candy According to Color, Dec. 1, 2010.

*Primary Examiner* — Sihar A Karwan

(74) *Attorney, Agent, or Firm* — Jon M. Isaacson

(57) ABSTRACT

A system includes an engagement tool (100) having a suction device (224), a movement system (166) configured to move the engagement tool (100), an imaging system (316) configured to capture an image of a surface of a meat product (202), and a computing device. The computing device is configured to (i) determine, from the image of the surface of the meat product (202), a target region (2061) on the surface of the meat product (202) based on an estimated fat content in the meat product (202) at the target region (2061), (ii) cause the movement system to move the engagement tool (100) with respect to the meat product (202) such that the suction device (224) engages the target region (2061), and (iii) initiate a vacuum within the suction device (224) such that the engagement tool (100) exerts a force on the target region of the surface of the meat product (202) at the suction device (224).

19 Claims, 11 Drawing Sheets

(51) Int. Cl.

| | | |
|---|---|---|
| *B25J 9/16* | (2006.01) | |
| *B25J 11/00* | (2006.01) | |
| *B25J 15/00* | (2006.01) | |
| *B25J 15/06* | (2006.01) | |

(52) U.S. Cl.
CPC ......... *B25J 9/1697* (2013.01); *B25J 11/0045* (2013.01); *B25J 15/0052* (2013.01); *B25J 15/0616* (2013.01)

(58) Field of Classification Search
CPC ... B25J 15/0052; B25J 15/0616; A23L 13/00; G01N 33/12
See application file for complete search history.

(56) References Cited

U.S. PATENT DOCUMENTS

| | | | | |
|---|---|---|---|---|
| 10,667,530 | B2 * | 6/2020 | Healey ................... | A22C 21/00 |
| 2007/0111648 | A1 * | 5/2007 | Martel ................... | A22B 5/007 |
| | | | | 452/118 |
| 2012/0247920 | A1 * | 10/2012 | Peters ................ | A22C 21/0053 |
| | | | | 198/407 |
| 2015/0205288 | A1 * | 7/2015 | Strong .............. | G05B 19/4185 |
| | | | | 700/114 |
| 2020/0077670 | A1 * | 3/2020 | Hjálmarsson .......... | A22C 25/18 |

FOREIGN PATENT DOCUMENTS

| | | | |
|---|---|---|---|
| WO | 2021163003 | A1 | 8/2021 |
| WO | 2021262782 | A1 | 12/2021 |

* cited by examiner

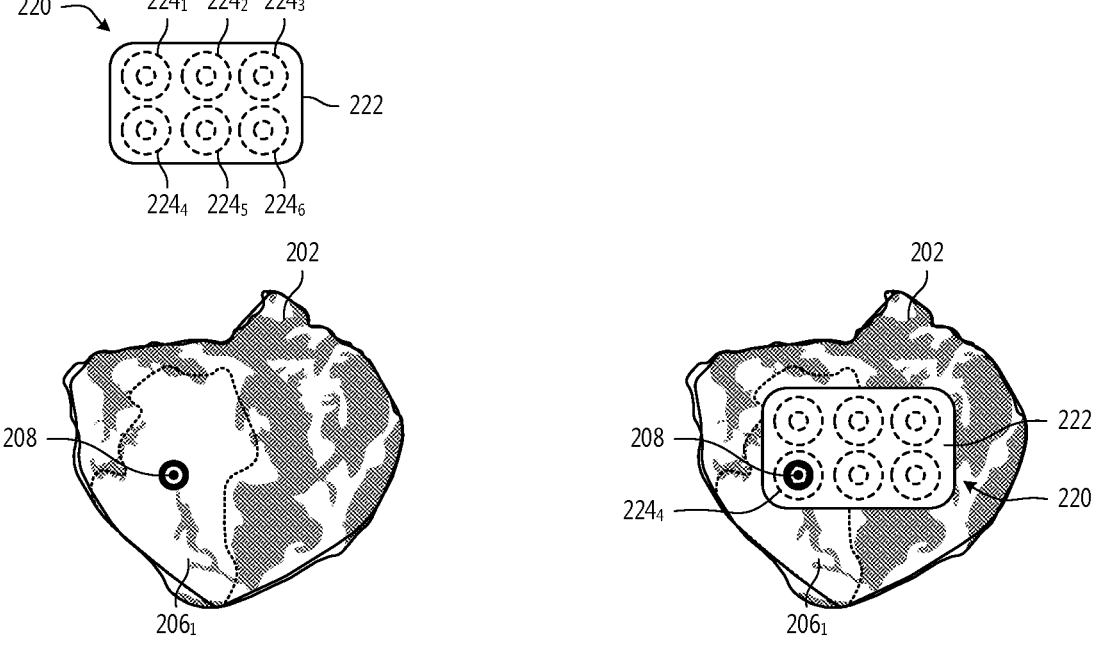
Fig. 2E                    Fig. 2F

TARGETING FOR VACUUM-BASED ENGAGEMENT TOOLS

BACKGROUND

Specification

The present disclosure is in the technical field of vacuum-based engagement tools. More particularly, the present disclosure is directed to targeting on meat products for engagement by suction devices on engagement tools.

End-of-arm tools are used on robotic arms for many functions, including gripping and moving objects. For example, suction devices on engagement or gripping tools can be used to grip the surface of an object, move the object, and place the object in a new location. In many cases, the upper surface of an object is gripped in this way, requiring the engagement tool to exert a suction force greater than the weight of the object on the upper surface of the object. For such engagement tools to be effective, the engagement tool needs to consistently and effectively engage objects so that the engagement tool can be used reliably and repeatedly to lift and move objects.

Some types of objects have uniform shapes, which make it relatively easy for engagement tools to grip the objects. Other objects, however, do not have uniform shapes. These objects are relatively difficult for engagement tools to reliably grip the objects. Examples of such non-uniform objects include food products, such as meat products. Meat products in particular take a wide variety of shapes and sizes, which pose difficulties in using engagement tools to properly engage and establish a force on the meat products using suction devices. In particular, it is difficult for section devices (e.g., suction cups) to establish a proper seal on meat products that have varying sizes and shapes. It would be advantageous to find a way to improve the effectiveness and reliability of engaging non-uniform objects so that engagement tools can be used to grip and move such non-uniform objects.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a system includes an engagement tool having a suction device, a movement system configured to move the engagement tool, an imaging system configured to capture an image of a surface of a meat product, and a computing device communicatively coupled to the movement system and the imaging system. The computing device is configured to (i) determine, from the image of the surface of the meat product, a target region on the surface of the meat product based on an estimated fat content in the meat product at the target region on the surface of the meat product, (ii) cause the movement system to move the engagement tool with respect to the meat product such that the suction device engages the target region on the surface of the meat product, and (iii) initiate a vacuum within the suction device such that the engagement tool exerts a force on the target region of the surface of the meat product at the suction device.

In a second embodiment, the estimated fat content in the meat product at the target region on the surface of the meat product of the first embodiment is above a predetermined level of fat content.

In a third embodiment, the predetermined level of fat content of the second embodiment is an estimated average fat content of the surface of the meat product.

In a fourth embodiment, the estimated fat content in the meat product at the target region non the surface of the meat product of any of the preceding embodiments is a highest estimated fat content on the surface of the meat product.

In a fifth embodiment, the computing device of any of the preceding embodiments, as part of determining the target region on the surface of the meat product, is configured to determine a target point in the target region on the surface of the meat product.

In a sixth embodiment, the meat product of any of the preceding embodiments includes a piece of raw meat in a package. The package is at least partially transparent and the surface of the meat product includes a surface of the package.

In a seventh embodiment, the package of the sixth embodiment includes at least one of a closed bag made from a plastic film, a vacuum-sealed bag made from plastic film, or a vacuum-seal packaging having a tray and a plastic film sealed across an opening of the tray.

In an eighth embodiment, the surface of the meat product of any of the preceding embodiments is an upper surface of the meat product.

In a ninth embodiment, the imaging system of any of the preceding embodiments is configured to capture the image of the surface of the meat product while the meat product is on a transportation system.

In a tenth embodiment, the movement system of any of the preceding embodiments includes a robotic arm configured to move the engagement tool within a three-dimensional space.

In an eleventh embodiment, the robotic arm of any of the preceding embodiments is further configured to rotate the engagement tool with respect to the meat product to provide an angular alignment of the engagement tool with respect to the meat product.

In a twelfth embodiment, the engagement tool of any of the preceding embodiments has a plurality of suction devices that includes the suction device and a second suction device.

In a thirteenth embodiment, the computing device of the twelfth embodiment is further configured to determine, from the image of the surface of the meat product, a second target region on the surface of the meat product based on the estimated fat content in the meat product at the target region on the surface of the meat product.

In a fourteenth embodiment, when the controller of the thirteenth embodiment causes the movement system to move the engagement tool with respect to the meat product such that the suction device engages the target region on the surface of the meat product, the controller is further configured to cause the movement system to move the engagement tool with respect to the meat product such that the second suction device engages the second target region on the surface of the meat product.

In a fifteenth embodiment, the controller of the fourteenth embodiment is further configured to cause the movement system to rotate the engagement tool with respect to the meat product to provide an angular alignment of the engagement tool with respect to the meat product before the suction device engages the target region and the second suction device engages the second target region.

In a sixteenth embodiment, the estimated fat content in the meat product at the target region of any of the preceding embodiments is based on one or more of an estimate of the thickness of fat content, a calculated surface area of fat content, or contouring of fat content.

In a seventeenth embodiment, a method can be performed to control a system that includes an engagement tool having a suction device and a movement system configured to move the engagement tool. The method includes capturing, by an imaging system, an image of a surface of a meat product and determining, by a computing device, a target region on the surface of the meat product from the image of the surface of the meat product based on an estimated fat content in the meat product at the target region on the surface of the meat product. The method further includes causing, by the computing device, a movement system to move the engagement tool with respect to the meat product such that the suction device engages the target region on the surface of the meat product, and initiating, by the computing device, a vacuum within the suction device such that the engagement tool exerts a force on the target region of the surface of the meat product at the suction device.

In an eighteenth embodiment, the estimated fat content in the meat product at the target region on the surface of the meat product of the seventeenth embodiment is above a predetermined level of fat content.

In a nineteenth embodiment, the meat product of any of the seventeenth to eighteenth embodiments includes a piece of raw meat in a package, the package is at least partially transparent, and the surface of the meat product includes a surface of the package.

In a twentieth embodiment, the surface of the meat product of any of the seventeenth to nineteenth embodiments is an upper surface of the meat product.

In a twenty first embodiment, the imaging system of any of the seventeenth to twentieth embodiments is configured to capture the image of the surface of the meat product while the meat product is on a transportation system.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIGS. 2E and 2F depicts top views of the meat product shown in the images of FIGS. 2A to 2D and an engagement tool capable of gripping the meat product, in accordance with the embodiments disclosed herein;

DETAILED DESCRIPTION

Figure 1A:
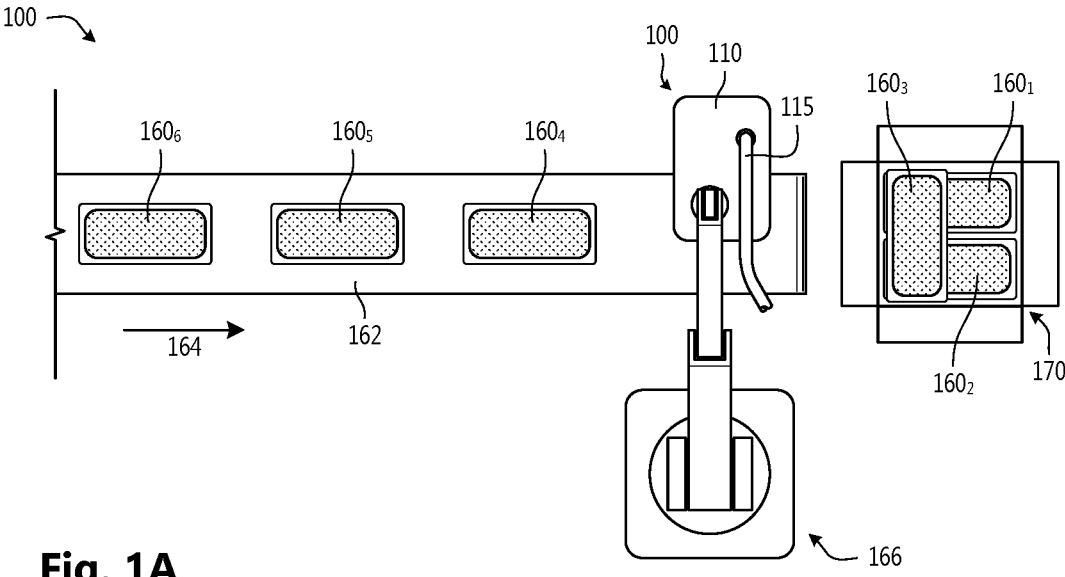
FIGS. 1A to 1D depict instances of an embodiment of a method of an engagement tool being used to load products into a shipping container, in accordance with the embodiments disclosed herein.

As noted above, engagement tools can be used to engage, lift, and move objects. FIGS. 1A to 1D depict instances of an embodiment of a method of an engagement tool 100 being used to load objects into a shipping container. In some embodiments, the engagement tool 100 has a vacuum manifold 110 that includes one or more suction devices (e.g., suction cups) on a lower surface thereof. The vacuum manifold 110 is coupled to a vacuum source (not shown) via a gas line 115. The vacuum source is configured to selectively draw a vacuum in the vacuum manifold 110 and the one or more suction devices. When the one or more suction devices are engaged with the surface of an object and the vacuum is drawn in the vacuum manifold 110, the one or more suction devices exert a force on the surface of the object. Examples of engagement tools (or gripping tools) and components thereof are discussed in detail in U.S. Provisional Patent Applications 62/972,229, 63/044,519, and 63/046,850, the contents of each of which are hereby incorporated by reference in their entirety.

FIGS. 1A to 1D also depict an environment 100 that includes a conveyor 162, a robotic arm 166, and a shipping container 170. In some embodiments, the conveyor 162 includes one or more of a conveyor belt, a set of rollers, a low-friction surface, a ramp, or any other mechanism configured to move objects. In the depicted embodiment, the engagement tool 100 has been coupled to the end of the robotic arm 166. In some embodiments, the robotic arm 166 can change the position, orientation, and/or operation of the engagement tool 100. For example, a computing device (e.g., a controller) can control the position of the robotic arm 166 to position the engagement tool 100, the orientation of the engagement tool 100 with respect to the end of the robotic arm 166 to orient the engagement tool 100, and/or a vacuum source coupled to the vacuum manifold 110 of the engagement tool 100 to control whether the engagement tool 100 is gripping an object. In some embodiments, the shipping container 170 is a cardboard box, a crate, a pallet, a bag, or any other container in which objects can be shipped. In the depicted embodiment, the shipping container 170 is a box that is open to receive objects.

The environment 100 also includes objects $160_1$, $160_2$, $160_3$, $160_4$, $160_5$, 1606, 1607 (collectively, objects 160). The conveyor 162 is configured to move the objects 160 in a downstream direction 164. In the depicted embodiment, the downstream direction 164 of the conveyor moves the objects 160 generally toward the shipping container 170. In the depicted embodiment, the robotic arm 166 is positioned proximate a downstream end of the conveyor 162 such that the robotic arm 166 can use the engagement tool 100 to transfer the objects 160 individually from the conveyor 162 to the shipping container 170. In some embodiments, the objects 160 are vacuum-packaged products. For example, each of the objects 160 can be a vacuum-packaged piece of raw meat (e.g., beef, chicken, turkey, fish, etc.). In some embodiments, at least some of the objects 160 have an upper surface that is a non-planar surface.

At the instance depicted in FIG. 1A, the objects $160_1$, $160_2$, $160_3$ are located in the shipping container 170 and the objects $160_4$, $160_5$, $160_6$ are located on the conveyor 162. In the depicted embodiment, the robotic arm 166 has already transferred the objects $160_1$, $160_2$, $160_3$ from the conveyor 162 into the shipping container 170. In the depicted embodiment, the objects $160_1$, $160_2$ have been placed in the shipping container to form a first layer of the objects 160 in the shipping container 170 and the objects $160_1$, $160_2$ have a similar orientation. The object $160_3$ has also been placed in the shipping container 170 on the objects $160_1$, $160_2$ as part of a second layer of the objects 160 in the shipping container 170. In some embodiments, each layer of the objects 160 has a different orientation than the layers of the objects 160 adjacent to the layer (sometimes called a "log cabin" arrangement). In the depicted embodiment, the object $160_3$ is oriented a different direction than the orientation of the objects $160_1$, $160_2$ (e.g., substantially perpendicular to the objects $160_1$, $160_2$). Also, at the instance depicted in FIG. 1A, the engagement tool 100 has been positioned and oriented by the robotic arm 166 in a manner that is not associated with any of the objects 160. In some cases, the position and orientation of the engagement tool 100 in FIG. 1A can be an arbitrary position and orientation of the engagement tool 100 or a default position and orientation of the engagement tool 100.

Figure 1B:
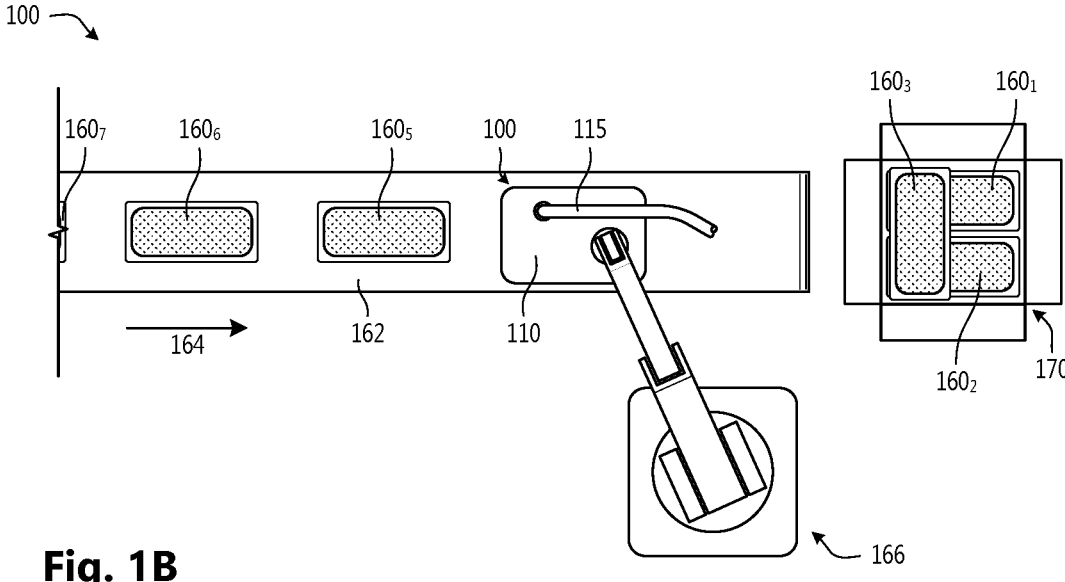

From the instance shown in FIG. 1A to the instance shown in FIG. 1B, the conveyor 162 advanced in the downstream direction 164. The advancement of the conveyor 162 caused the objects $160_4$, $160_5$, $160_6$ to move in the downstream direction and a portion of the object 1607 to enter the area of the environment 100 that is visible in FIG. 1B. From the instance shown in FIG. 1A to the instance shown in FIG. 1B, the robotic arm 166 moved the engagement tool 100 over the location of the object 1604 on the conveyor 162. The robotic arm 166 also oriented the engagement tool 100 with respect to the object 1604. In the depicted embodiment, the longest dimension of the engagement tool 100 is oriented substantially parallel to the longest dimension of the object 1604.

At the instance shown in FIG. 1B, the robotic arm 166 has positioned the engagement tool 100 with respect to the object $160_4$ such that one or more suction devices on the lower side of the engagement tool 100 have engaged the upper surface of the object $160_4$. At the instance depicted in FIG. 1B, a vacuum source can be activated to cause a vacuum to be drawn in the vacuum manifold 110. With one or more suction devices engaged by the surface of the object $160_4$ and the one or more suction devices engaged by the object $160_4$, the vacuum being drawn in the vacuum manifold 110 causes a force to be exerted on the surface of object $160_4$ at the one or more suction devices. In this way, the object $160_4$ is gripped by the engagement tool 100. While the object $160_4$ is gripped by the engagement tool 100, the robotic arm 166 can move the object $160_4$ from the location of the object in FIG. 1B to another location. In some embodiments, a computing device (e.g., a controller) is capable of controlling both the movements and orientation of the robotic arm 166 and the operation of the vacuum source.

Figure 1C:
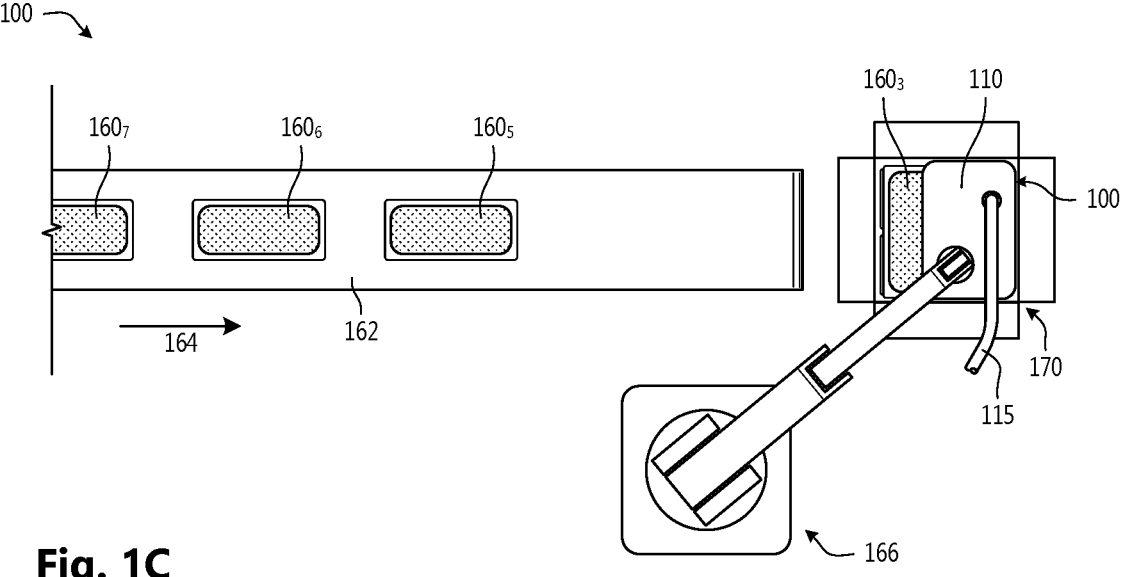
Figure 1D:
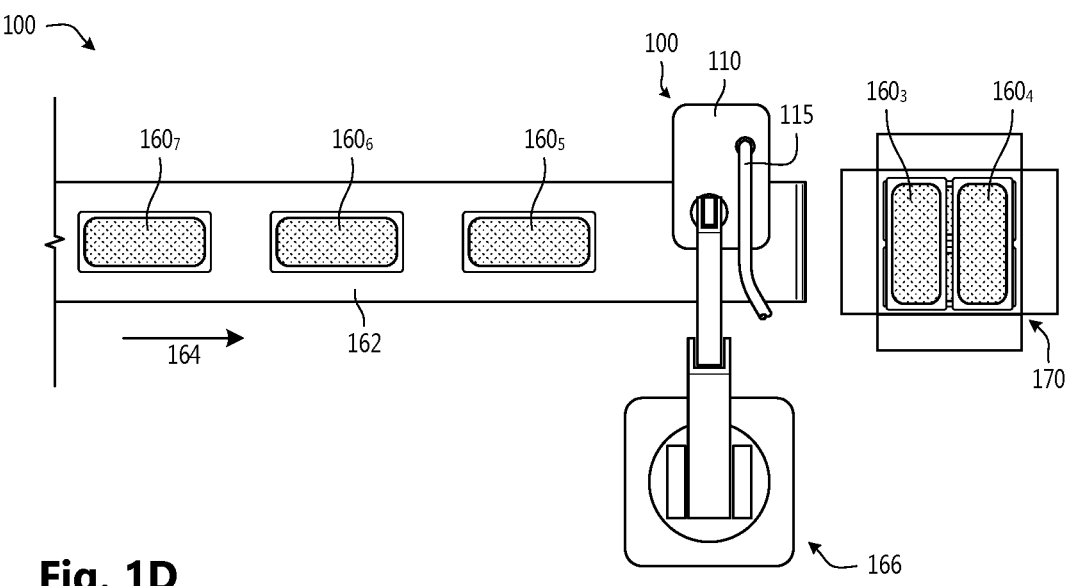

From the instance shown in FIG. 1B to the instance shown in FIG. 1C, the robotic arm 166 has moved the engagement tool 100 while the engagement tool 100 is gripping the object 1604 to another location. More specifically, the engagement tool 100 moved the object 1604 from the location on the conveyor 162 shown in FIG. 1B to a location in the shipping container 170 next to the object $160_3$. In order for the engagement tool 100 to grip the object 1604 between the instances shown in FIG. 1B and FIG. 1C, the vacuum source continues to apply the vacuum in the vacuum manifold 110 between the instances shown in FIG. 1B and FIG. 1C. Thus, even though the engagement tool 100 moves the object 1604 over an area where there is no bottom support for the object $160_4$, the engagement tool 100 applies a force on the object $160_4$ that is greater than the weight of the object $160_4$ such that the object $160_4$ is gripped by the engagement tool 100 while the object $160_4$ is moved.

In the depicted embodiment, as the robotic arm 166 moved the object $160_4$ from the location on the conveyor 162 to the location in the shipping container 170, the robotic arm 166 changed the orientation of the object $160_4$ as the object $160_4$ was moved. In the specific embodiment depicted, the object $160_4$ was oriented substantially perpendicular to the object $160_3$ when it was on the conveyor 162 and the robotic arm 166 changed the orientation of the object $160_4$ as it was moved so that the object $160_4$ was oriented substantially parallel to the object $160_3$ when it was placed in the shipping container 170. In this way, the object $160_4$ is oriented to a desired orientation for placement in the shipping container 170. More specifically, the object $160_4$ is oriented so that the object $160_4$ completes the second layer of the objects 160 in the shipping container 170.

At the instance shown in FIG. 1C, when the object $160_4$ is at the location in the shipping container 170 next to the object $160_3$, the vacuum source can be caused to stop applying the vacuum in the vacuum manifold 110 so that the object $160_4$ is no longer gripped by the engagement tool 100. When the vacuum source is no longer applying the vacuum in the vacuum manifold 110, the one or more suction devices no longer apply a force to the object $160_4$ so that the object $160_4$ is no longer gripped by the engagement tool 100. After the object $160_4$ is no longer gripped by the engagement tool 100, the robotic arm 166 can be moved so that the engagement tool 100 is no longer in contact with the object $160_4$. In the depicted embodiment, from the instance shown in FIG. 1C to the instance shown in FIG. 1D, the robotic arm 166 was moved so that the engagement tool 100 is no longer in contact with the object $160_4$ and the engagement tool 100 has been moved away from the object $160_4$. In the instance shown in FIG. 1D, the object $160_4$ remains in the shipping container 170 and the arbitrary or default position and orientation of the engagement tool 100 that was shown in FIG. 1A.

The embodiment of the method shown in FIGS. 1A to 1D can be repeated multiple times to continue loading the shipping container 170. For example, the conveyor 162 can continue to move the objects 160 in the downstream direction 164 and the robotic arm 166 and the engagement tool 100 can be used to individually move the objects from the conveyor 162 to the shipping container 170. The robotic arm 166 and the engagement tool 100 can also control the locations and orientations of the objects 160 in the shipping container 170 to achieve a particular arrangement of the objects 160 in the shipping container 170.

As noted above, when a vacuum-based engagement tool is used to grip non-uniform objects, the non-uniformity of the objects may make it difficult for suction devices on the vacuum-based engagement tool to establish sufficient contact with the surface of the object. Poor contact with the suction devices and surface of objects can prevent the engagement tool from reliably engaging such objects. In some embodiments, meat products are one example of such non-uniform objects. Meat products can include pieces of raw or cooked meat, such as beef, chicken, turkey, pork, fish, and the like. In some embodiments, meat products can be a raw piece of meat with no packaging. In some embodiments, meat products can be a raw piece of meat located in packaging that is at least partially transparent. In one example, such packaging may include a closed bag made from a plastic film and the piece of meat can be located in the closed bag. In another example, such packaging may include a vacuum-sealed bag made from a plastic film and the piece of meat can be located in the vacuum-sealed bag. In another example, such packaging may include a vacuum-seal packaging having a tray (e.g., a mostly-opaque tray) and a plastic film (e.g., a mostly-transparent film) sealed across an opening of the tray and the piece of meat can be located between the tray and the film. There are many other examples of packaging in which a piece of meat can be located. In many examples described herein, the interaction between a meat product and a suction device is described as being directly between the piece of meat and the suction device; however, it will be understood that such an interaction can include a part of packaging (e.g., a film) of the meat product between the piece of meat and the suction device.

One challenge with establishing proper contact between a meat product and a suction device is the variety of types of surfaces in a piece of meat. For example, a piece of meat can include various types of muscle tissue, different types of connective tissues (e.g., ligaments, tendons, silverskin, muscle fibers, etc.), bones, fat tissue, and the like. A suction device, such as a suction cup, interacts differently with each of the different types of surfaces of meat products. Some types of surfaces decrease the likelihood that suction devices will form a proper seal with the piece of meat. For example, if a suction device contacts a bone having a certain shape (or packaging material against the bone), the bone may prevent the suction device from forming a proper seal. Other types of surfaces decrease the likelihood that suction devices will form a proper seal with the piece of meat. For example, if a suction device contacts fatty tissue (or packaging material against the fatty tissue), the fatty tissue can make it more likely that the suction device will form a proper seal. In some cases, intermuscular fat (rather than the intramuscular fat), can make it more likely that the suction device will form a proper seal. In some examples, intermuscular fat having at least as much surface area as the surface area of the suction device can make it more likely that the suction device will form a proper seal.

In some embodiments, an engagement device can be moved such that a suction device (e.g., a suction cup) engages a portion of the surface of the meat product that would be favorable to forming a proper seal against the meat product. In some instances, a high percentage of fat content may be considered a portion of the surface of the meat product that is favorable for forming a proper seal. Thus, the engagement tool with respect to the meat product such that the suction device engages a target region on the surface of the meat product, where the target region on the surface of the meat product based on an estimated fat content in the meat product. Such a target region can be determined based on image data, as is described in the embodiments shown in FIGS. 2A to 2F and in FIGS. 3A to 3D.

FIGS. 2A to 2D depict an embodiment of an image 200 of a meat product 202. The image 200 also includes background sections 204 that are around the meat product 202. In some embodiments, a computing device is capable of processing the image 200 to determine the portions of the image 200 that include the meat product 202 and the portions of the image 200 that include the background sections 204. The image 200 shows one surface of the meat product 202. In some embodiments, the surface visible in the image 200, the visible surface of the meat product 202 is a surface of the meat product 202 that is intended to be engaged by an engagement device. In the depicted embodiment, the surface of the meat product 202 that is visible in the image 200 is an upper surface of the meat product 202. In some embodiments, the background section 204 may show a surface on which the meat product 202 is resting, such as a conveyor belt, a tabletop, and the like.

Figure 2A:
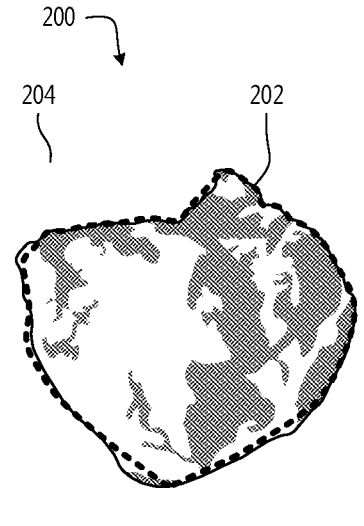
FIGS. 2A to 2D depict an embodiment of an image of a meat product, in accordance with the embodiments disclosed herein.

In the embodiment shown in FIG. 2A, the computing device has detected a boundary (shown in a dashed line) between the meat product 202 and the background sections 204. The computing device can use any type of image processing to determine the boundary between the meat product 202 and the background sections 204. In some examples, the computing device can utilize a color-pixel-count-based method, such as those described in International Application No. PCT/US2019/036301 and U.S. Pat. No. 10,667,530, the contents of which are hereby incorporated by reference in their entirety. In some examples, the computing device can use a machine-learning method, such as those described in International Application No. PCT/US2019/034488, the contents of which are hereby incorporated by reference in their entirety. In other examples, the computing device can use any other method or technique of image processing to determine the boundary between the meat product 202 and the background sections 204.

Figure 2B:
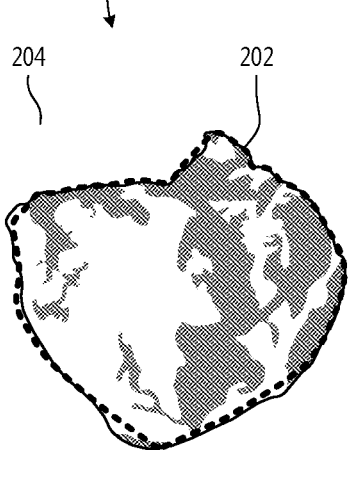

In FIG. 2B, the computing device has identified regions 206₁, 206₂, 206₃, and 206₄ (collectively, regions 206) of the meat product 202. In the depicted embodiment, the regions 206 include four regions; however, in other embodiments, the computing device may identify any number of regions, such as any plurality of regions. In some embodiments, the regions 206 are identified based on an estimated similarity of tissue content (e.g., fat content) in the regions. In one example, one region may include a particularly high estimated fat content, another region may have a particularly low estimated fat content, and yet another region may have an estimated fat content between the other two. In another example, one or more regions may be estimated to have a fat content above a predetermined threshold, while one or more other regions may be estimated to have a fat content below the predetermined threshold. The computing device can use any type of image processing to determine the regions 206, such as color-pixel-count-based methods, machine-learning methods, and the like.

Figure 2C:
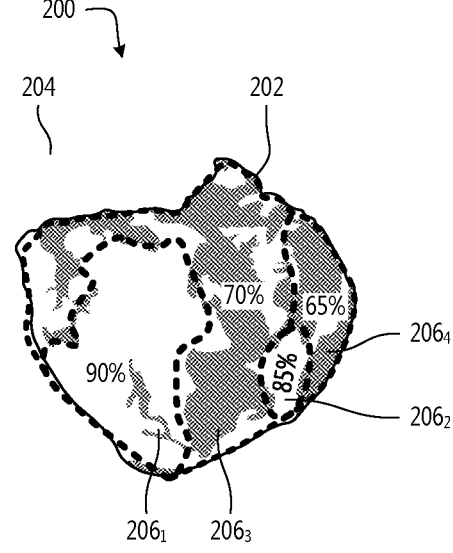

In FIG. 2C, the computing device has identified an estimated fat content for each of the regions 206. In the particular example depicted in FIG. 2C, the region 206₁ has an estimated fat content of 90%, the region 206₂ has an estimated fat content of 85%, the region 206₃ has an estimated fat content of 70%, and the region 206₄ has an estimated fat content of 65%. It will be apparent that, in other embodiments, the estimated fat content in the regions 206 could differ from the depicted embodiment. In some embodiments, the estimated fat content is an estimated fat content on the surface of the meat product 202 that is visible in the image 200. In some embodiments, the computing device estimates the estimated fat content is each of the regions 206 using any type of image processing, such as color-pixel-count-based methods, machine-learning methods, and the like.

In some embodiments, the computing device determines a target region based on the estimated fat content in the regions 206. In the depicted embodiment, the computing device may determine that the region 206₁ is the target region because the region 206₁ has the highest estimated fat content of any of the regions 206. In other embodiments, the target region may be determined based on the estimated fat content in a region being above a predetermined level of fat content. For example, the predetermined level of fat content may be an estimated average fat content of the surface of the meat product 202. In other embodiments, the target region may be determined based on the estimated fat content in a region in any other manner.

Figure 2D:
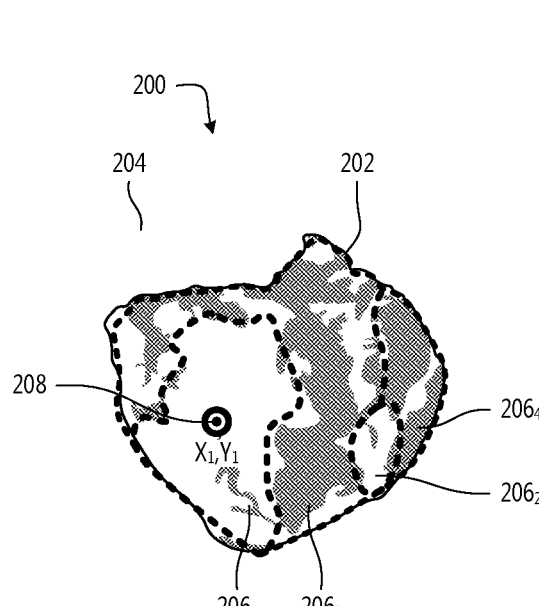

FIG. 2D depicts that the computing device may optionally determine a target point 208 within the target region. In the depicted embodiment, the region 206₁ is the target region and the target point 208 is located within the region 206₁. As shown in FIG. 2D, the target point can be defined by Cartesian coordinates, such as the two-dimensional coordinates $(X_1, Y_1)$ shown or three-dimensional coordinates $(X_1, Y_1, Z_1)$. The target point can also be defined by any other type of coordinate system (e.g., polar, cylindrical, spherical, etc.) or any other manner of defining a point within a space. In some embodiments, the computing device may define the target point 208 anywhere within the target region, such as near a center of mass of the meat product 202, near a center of the target region, at least a certain distance (e.g., a distance of a radius of a suction cup that will be used to engage the meat product 202) away from a boundary of the target region, at least a certain distance away from the outer edge of the meat product 202, and the like. In some embodiments, the computing device may further determine a planarity of one or more target areas so that a suction device can be oriented substantially perpendicular to the target area when contacting the meat product 202. Orienting the suction device substantially perpendicular to the target area can increase the likelihood of establishing a proper seal between the suction device and the meat product 202.

FIG. 2E depicts a top view of the meat product 202 and an engagement tool 220. The engagement tool 220 includes a vacuum manifold 222. The vacuum manifold 222 can be coupled to a vacuum source (not shown), such as a vacuum pump, that is capable of drawing a vacuum in the vacuum manifold 222. In the depicted embodiment, the engagement tool 220 also includes suction devices 224₁, 224₂, 224₃, 224₄, 224₅, and 224₆ (collectively, suction devices 224). In some embodiments, the suction devices 224 are suction cups or other structures capable of forming a seal against a surface. Each of the suction devices 224 is fluidly coupled in parallel to the vacuum manifold 222. In some embodiments, each of the suction devices 224 includes a valve that is biased closed but will open when the suction device engages the surface of an object. In this way, the vacuum drawn in the vacuum manifold 222 will be extended to each of the suction devices 224 that are engaged with an object and only to those suction devices 224 that are engaged with an object. In the depicted embodiment, there are six of the suction devices 224. In other embodiments, the engagement tool 220 could include any number of suction devices (i.e., one or more suction devices).

In FIG. 2E, the engagement tool 220 is located away from the meat product 202. In particular, the target region 206₁ on the meat product 202 is shown and none of the suction devices 224 is aligned with the target region 206₁. In some embodiments, the engagement tool 220 is coupled to a movement system that is configured to move the engagement tool 220 with respect to the meat product 202. In some embodiments, the movement mechanism is a robotic arm (e.g., the robotic arm 166) that is capable of moving the engagement tool 220 within a three-dimensional space. In some embodiments, the meat product 202 may be located on a transportation system (e.g., a conveyor belt) and the engagement tool 220 may be coupled to rails located above and aligned perpendicular to the transportation system such that the movement mechanism can move the engagement tool 220 along the rails and vertically from the rails toward the transportation system. In any case, the movement mechanism is capable of positioning and/or aligning the engagement tool 220 with the meat product 202.

The movement mechanism may be communicatively coupled to a computing device configured to control the movement system to move the engagement tool. In some embodiments, the computing device (e.g., one or more computing devices) is configured to both (i) determine, from the image 200 of the surface of the meat product 202, the target region 206₁ on the surface of the meat product 202 based on the estimated fat content in the meat product 202 at the target region 206₁ on the surface of the meat product 202, and (ii) cause the movement system to move the engagement tool 220 with respect to the meat product 202 such that at least one of the suction devices 224 engages the target region 206₁ on the surface of the meat product 202. As shown in FIG. 2F, the engagement device 220 has been moved such that the suction device 224₄ has engaged the target region 206₁. In the depicted embodiment in particular, the suction device 224₄ is aligned with and has engaged the target point 208. Once the suction device 224₄ has engaged the target region 206₁, the computing device can initiate a vacuum within the suction device (e.g., by initiating the vacuum source coupled to the vacuum manifold 222) such that the engagement tool 220 exerts a force on the target region 206₁ of the surface of the meat product 202 at the suction device 224₄. At that time, the engagement tool 220 can be moved while gripping the meat product 202 to move the meat product 202.

When the engagement tool 220 is moved such that one of the suction devices 224 engages the target region from the regions 206, the computing device may take into account other factors to determine the position and/or orientation of the engagement tool 220. In one example, the computing device may cause the engagement tool 220 to be positioned and/or oriented to cover a center of mass of the meat product 202. In the embodiment shown in FIG. 2F, the engagement tool 220 is positioned such that the suction device 224₄ is aligned with and has engaged the target point 208, but the engagement tool 220 has also been positioned and/or oriented to cover an estimated center of mass of the meat product 202. Thus, while the engagement between the suction device 224₄ and the target region 206₁ is expected to be sufficient to grip the meat product 202 while the meat product 202 is moved, any engagement of the other suction devices 224 with the meat product 202 will further increase the reliability of the grip of the engagement tool 220 on the meat product 202. In another example, the computing device may cause the engagement tool 220 to be positioned and/or oriented to minimize the number of suction devices 224 that overhang or are located outside of the edge of the meat product 202. Any suction devices 224 in these positions will be unusable during gripping of the meat product 202. The computing device can take any other factors when determining the location and/or orientation of the engagement tool 220 with respect to the meat product 202.

In the embodiment shown in FIGS. 2A to 2F, one target region and one target point were determined on the meat product 202. In some embodiments, it may be advantageous to determine more than one target regions and/or more than one target points. FIGS. 3A to 3D depict an embodiment of determine more than one target regions and more than one target points for more than one of the suction devices 224 of the engagement tool 220 to engage the meat product 202.

Figure 3A:
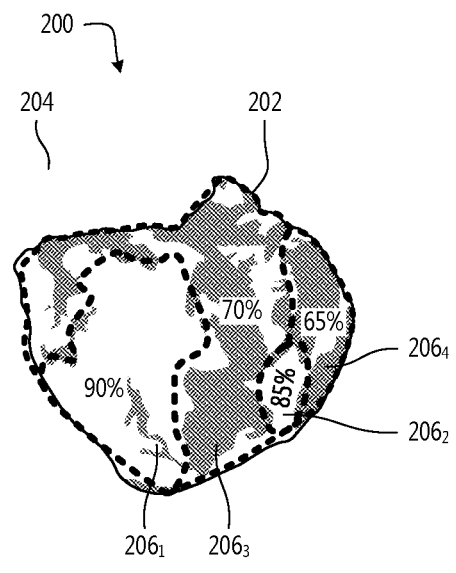
FIGS. 3A and 3B depict an embodiment of an image of a meat product, in accordance with the embodiments disclosed herein.

FIG. 3A shows a depiction of the image 200, which is similar to the depiction of the image 200 shown in FIG. 2C. In FIG. 3A, the computing device has identified an estimated fat content for each of the regions 206. In the particular example depicted in FIG. 3A, the region $206_1$ has an estimated fat content of 90%, the region $206_2$ has an estimated fat content of 85%, the region $206_3$ has an estimated fat content of 70%, and the region $206_4$ has an estimated fat content of 65%. In some embodiments, the computing device determines more than one target region based on the estimated fat content in the regions 206. In the depicted embodiment, the computing device may determine that the region $206_1$ is a first target region because the region $206_1$ has the highest estimated fat content of any of the regions 206 and determine that the region $206_2$ is a second target region because the region $206_2$ has the second highest estimated fat content of the regions 206.

Figure 3B:
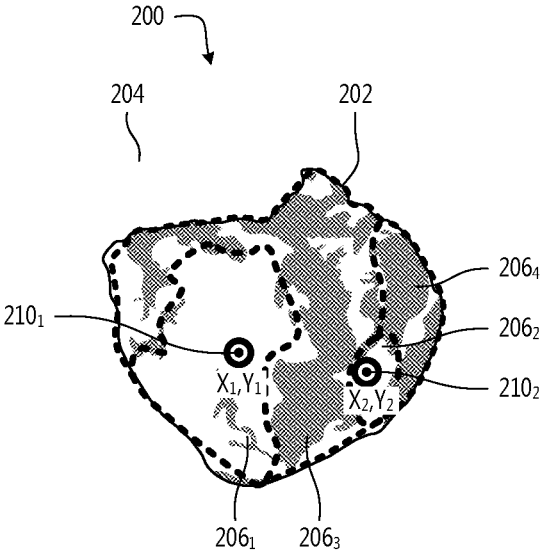

FIG. 3B depicts that the computing device may optionally determine target points within the target regions. In the depicted embodiment, the region $206_1$ is the first target region and a first target point $210_1$ is located within the first target region $206_1$ and the region $206_2$ is the second target region and a second target point $210_1$ is located within the second target region $206_2$. As shown in FIG. 3B, the target points can be defined by Cartesian coordinates, such as the two-dimensional coordinates $(X_1, Y_1)$ shown for the first target point $210_1$ and the two-dimensional coordinates $(X_2, Y_2)$ shown for the second target point $210_2$. The target points can be defined in any other manner of defining a point within a space (e.g., three-dimensional coordinates). In some embodiments, the computing device may define the first and second target points $210_1$ and $210_2$ anywhere within the first and second target regions $206_1$ and $206_2$, respectively, such as near a center of mass of the meat product 202, near a center of the receptive target region, at least a certain distance away from a boundary of the receptive target region, at least a certain distance away from the outer edge of the meat product 202, and the like.

Figure 3C:
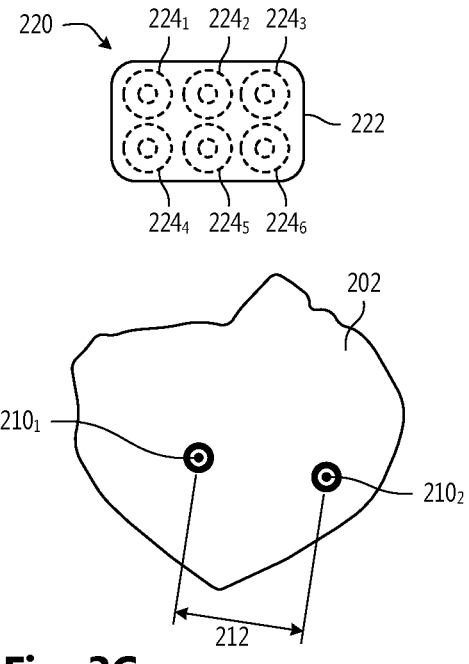
FIGS. 3C and 3D depicts top views of the meat product shown in the images of FIGS. 3A and 3B and an engagement tool capable of gripping the meat product, in accordance with the embodiments disclosed herein.

FIG. 3C depicts a top view of the meat product 202 and the engagement tool 220. In FIG. 3C, the engagement tool 220 is located away from the meat product 202. In particular, the first and second target regions $206_1$ and $206_2$ on the meat product 202 are shown and none of the suction devices 224 is aligned with either of the first and second target regions $206_1$ and $206_2$. In some embodiments, the engagement tool 220 is coupled to a movement system that is configured to move the engagement tool 220 with respect to the meat product 202. FIG. 3C also depicts a distance 212 between the first and second target points $210_1$ and $210_2$. In some embodiments, the computing device determines the locations of the first and second target points $210_1$ and $210_2$ such that the distance 212 corresponds with a distance between two of the suction devices 224.

In some embodiments, the computing device (e.g., one or more computing devices) is configured to both (i) determine, from the image 200 of the surface of the meat product 202, the first and second target regions $206_1$ and $206_2$ on the surface of the meat product 202 based on the estimated fat content in the meat product 202 at the first and second target regions $206_1$ and $206_2$ on the surface of the meat product 202, and (ii) cause the movement system to move the engagement tool 220 with respect to the meat product 202 such that at least one of the suction devices 224 engages each of the first and second target regions $206_1$ and $206_2$ on the surface of the meat product 202.

Figure 3D:
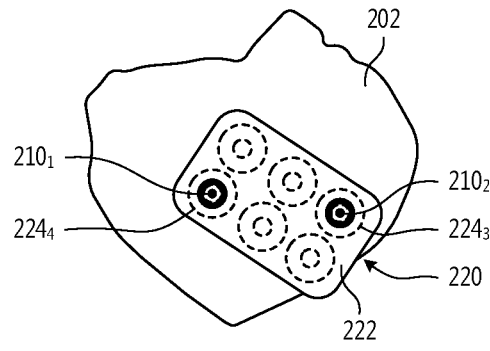

As shown in FIG. 3D, the engagement device 220 has been moved such that the suction device $224_4$ has engaged the first target region $206_1$ and the suction device $224_3$ has engaged the second target region $206_1$. In the depicted embodiment in particular, the suction device $224_4$ is aligned with and has engaged the first target point $210_1$ and the suction device $224_3$ is aligned with and has engaged the second target point $210_2$. In order to reach the point shown in FIG. 3D, the movement system (e.g., a robotic arm) rotated the engagement tool 220 with respect to the meat product 202 to provide an angular alignment of the engagement tool 220 with respect to the meat product 202. Once the suction devices $224_4$ and $224_3$ have engaged the first and second target regions $206_1$ and $206_2$, respectively, the computing device can initiate a vacuum within the suction device (e.g., by initiating the vacuum source coupled to the vacuum manifold 222) such that the engagement tool 220 exerts a force on the first and second target regions $206_1$ and $206_2$ of the surface of the meat product 202 at the suction devices $224_4$ and $224_3$, respectively. At that time, the engagement tool 220 can be moved while gripping the meat product 202 to move the meat product 202.

Figures 4A, 4B:
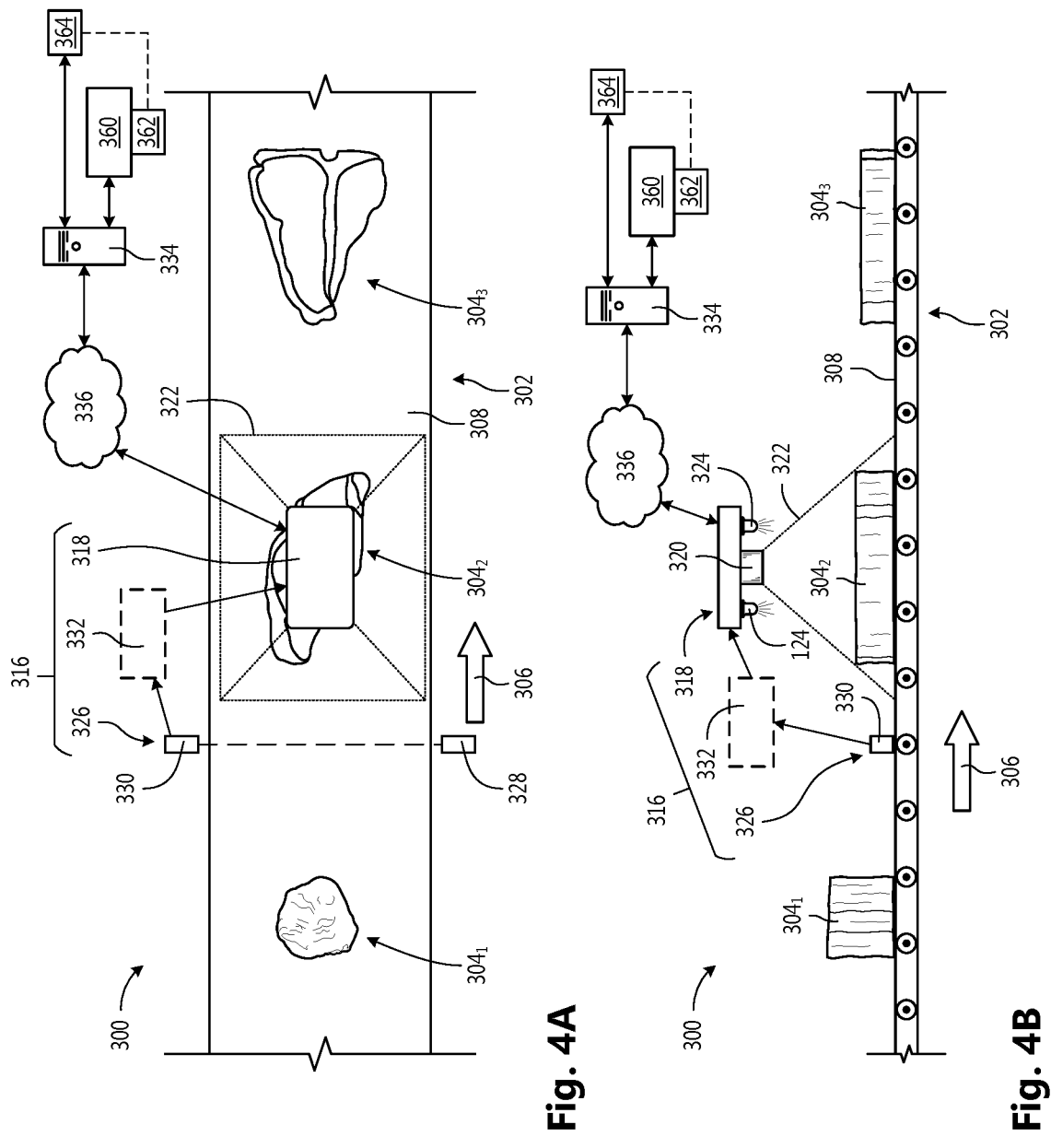
FIGS. 4A and 4B depict top and side views of an embodiment of a system for obtaining images of meat products and controlling an engagement tool, in accordance with the embodiments disclosed herein.

Depicted in FIGS. 4A and 4B are top and side views of a system 300 for obtaining images of meat products and controlling an engagement tool. The system 300 includes a transportation system 302 configured to transport meat products $304_1$, $304_2$, and $304_3$ (collectively meat products 304) in a transportation direction 306. In the depicted embodiment, the transportation system 302 includes a conveyor belt 308 on which the meat products 304 are located. In the depicted embodiment, only a portion of the transportation system 302 is depicted; additional meat products 304 may be located on portions of the transportation system 302 that are not depicted in FIGS. 4A and 4B.

The system 300 includes an imaging system 316 that is configured to obtain capture images of the meat products 304. In some embodiments, the imaging system 316 is configured to capture images of the meat products 304 as the meat products 304 are transported by the transportation system 302 in the transportation direction 306. In some embodiments, the images captured by the imaging system 316 of the meat products 304 includes one or more still images, one or more videos, or any combination thereof.

In the depicted embodiment, the imaging system 316 includes an image capture system 318. The image capture system 318 includes a camera 320 configured to capture images within a field 322. In some embodiments, the camera 320 includes one or more of a semiconductor charge-coupled device (CCD), an active pixel sensor in a complementary metal-oxide-semiconductor (CMOS) integrated circuit, an active pixel sensor in N-type metal-oxide-semiconductor (NMOS, Live MOS) integrated circuit, a three-dimensional (3D) sensor, a line scanner, or any other digital image sensor, or any combination thereof. In the depicted embodiment, the camera 320 is arranged so that the field 322 is directed toward a portion of the transportation system 302. In the instance depicted in FIGS. 4A and 4B, the meat product 304₂ is located on the conveyor belt 308 within the field 322 of the camera 320. With the meat product 304₂ in that location, the camera 320 is configured to obtain one or more images of the meat products 304₂, one or more videos of the meat products 304₂, or a combination of images and videos of the meat product 304₂.

In some embodiments, the image capture system 318 also includes one or more electromagnetic energy sources 324 configured to emit electromagnetic energy into the field 322 of the camera 320. In some embodiments, the one or more electromagnetic energy sources 324 are configured to emit electromagnetic energy in one or more of an X-ray range of wavelengths (i.e., electromagnetic energy having a wavelength between about 0.001 nm and about 30 nm), an ultraviolet range of wavelengths (i.e., electromagnetic energy having a wavelength between about 30 nm and about 400 nm), a visible range of wavelengths (i.e., electromagnetic energy having a wavelength between about 380 nm and about 760 nm), or an infrared range of wavelengths (i.e., electromagnetic energy having a wavelength between about 750 nm and about 3 mm). In some embodiments, the range(s) of wavelengths of the electromagnetic energy emitted by the electromagnetic energy sources 324 is determined based on a desired characteristic of the image data obtained by the camera 320.

In the depicted embodiment, the imaging system 316 also includes a presence detector system 326. In the depicted embodiment, the presence detector system 326 is a photoelectric sensor (e.g., a photo eye). More specifically, the depicted embodiment of the presence detector system 326 is a through-beam photoelectric sensor that includes a transmitter 328 and a detector 330. The transmitter 328 is configured to emit electromagnetic energy (e.g., infrared electromagnetic energy, visible electromagnetic energy, etc.) toward the detector 330. The detector 330 is configured to detect the electromagnetic energy emitted by the transmitter 328. If the detector 330 fails to detect the electromagnetic energy, the detector 330 can generate a signal indicative of an object passing between the transmitter 328 and the detector 330. In other embodiments, the presence detector system 326 may be a through-beam photoelectric sensor that includes a transceiver in place of the detector 330 and a reflector in place of the transmitter 328. The transceiver emits electromagnetic energy toward the reflector, which reflect the electromagnetic energy back to the transceiver. When any break in the electromagnetic energy is detected by the transceiver, the transceiver can generate a signal indicative of an object passing between the transceiver and the reflector. In other embodiments, the presence detector system 326 may be a diffusing photoelectric sensor that is located on only one side of the transportation system 302 and is capable of detecting the presence of an object on the conveyor belt 308.

In the depicted embodiment, the presence detector system 326 is communicatively coupled to a controller 332. When the presence detector system 326 detects the presence of an object on the transportation system 302, the presence detector system 326 is configured to communicate a signal to the controller 332 indicative of the presence of the object. The controller 332 is communicatively coupled to the image capture system 318. The controller 332 is configured to cause the image capture system 318 to capture images of one of the meat products 304. In the embodiment shown in FIGS. 4A and 4B, the controller 332 is external to both the image capture system 318 and the presence detector system 326. In this case, the controller 332 may be a computing device in communication with each of the image capture system 318 and the presence detector system 326. In other embodiments, the controller 332 may be integrated with either the image capture system 318 or the presence detector system 326. In some embodiments, the controller 332 is capable of controlling the timing of the image capture system 318 so that one of the meat products 304 is in the field 322 of the camera 320 when the image capture system 318 obtains the image data.

In one example, as the transportation system 302 continues to move the meat products 304 in the transportation direction 306, the presence detector system 326 will detect the presence of the meat product 304₁ as the meat product 304₁ is moved between the transmitter 328 and the detector 330, and the detector 330 sends a signal to the controller 332 indicative of the presence of the meat product 304₁. As the meat product 304₁ continues to move in the transportation direction 306, the controller 332 causes the image capture system 318 to capture images of the meat product 304₁. In some embodiments, the controller 332 controls the timing of the image capture system 318 so that the meat product 304₁ is within the field 322 if the camera 320 during at least a portion of the time that the camera obtains the image data of the meat product 304₁.

In the depicted embodiment, the imaging system 316 is communicatively coupled to a computing device 334 via a network 336. In some embodiments, the computing device 334 can be a remote computing device. As used herein, the term "remote computing device" refers to a computing device that is located sufficiently far from a location that a user at the location cannot interact directly with the remote computer device. In other embodiments, the computing device 334 can be a local computing device. As used herein, the term "local computing device" refers to a computing device that is located at a location such that a user at the location can interact directly with the local computer device. The computing device 334 may be any type of computing device, such as a server, a desktop computer, a laptop computer, a cellular telephone, a tablet, and the like.

In some embodiments, the network 336 is a wired network, such as an Ethernet local area network (LAN), a coaxial cable data communication network, an optical fiber network, a direct wired serial communication connection (e.g., USB), or any other type of wired communication network. In some embodiments, the network 336 is a wireless network, such as a WiFi network, a radio communication network, a cellular data communication network (e.g., 4G, LTE, etc.), a direct wireless communication connection (e.g., Bluetooth, NFC, etc.), or any other type of wireless communication network. In some embodiments, the network 336 is a combination of wired and wireless networks. In some embodiments, the network 336 may be a private network (e.g., a private LAN), a public network (e.g., the internet), or a combination of private and/or public networks.

In some embodiments, the imaging system 316 is configured to send images obtained of the meat products 304 to the computing device 334 via the network 336. In the depicted embodiment, the image capture system 318 is configured to send the image data to the computing device 334 via the network 336. The computing device 334 is configured to determine, from the images of the surfaces of the meat products 304, a target region on the surface of the meat products 304 based on an estimated fat content in the meat products 304 at the target region on the surface of the meat product 304.

The computing device 334 is also communicatively coupled to a movement system 360. The movement system 360 is configured to move an engagement tool 362. The engagement tool 362 includes one or more suction devices (e.g., suction cups) configured to engage the surfaces of the meat products 304. For example, the movement system 360 can move the engagement tool 362 in way similar to those described above with respect to FIGS. 2A to 2F and FIGS. 3A to 3D. The computing device 334 is configured to cause the movements of the movement system 360, such as by sending a control signal to the movement system 360 indicating how the movement system 360 is to position and/or orient the engagement tool 362.

The computing device 334 is also communicatively coupled to a vacuum source 364. The vacuum source 364 is coupled to the engagement tool 362 (e.g., via a gas line) and is configured to draw a vacuum within the engagement tool 362 (e.g., draw a vacuum via the gas line). In some embodiments, the vacuum source 364 is a vacuum pump or any other device capable of drawing a vacuum. The computing device 334 is configured to initiate a vacuum within the engagement tool 362 by controlling operation of the vacuum source 364, such as by sending a control signal to the vacuum source 364 indicating operation of the vacuum source 364, such as when the vacuum source 364 is to operate, at what power level the vacuum source 364 is to operate, and the like.

In the embodiment shown in FIGS. 4A and 4B, the meat products 304 are pieces of meat with no exterior packaging. In this case, the image capture system 318 may be configured to capture images of the surface of the pieces of meat and the engagement tool 362 may be configured to directly engage the surfaces of the pieces of meat directly. In other embodiments, the system 300 can be used with meat products that include pieces of meat located in packaging. Examples of such meat products are shown in FIGS. 5A and 5B and in FIGS. 6A and 6B.

Figures 5A, 5B:
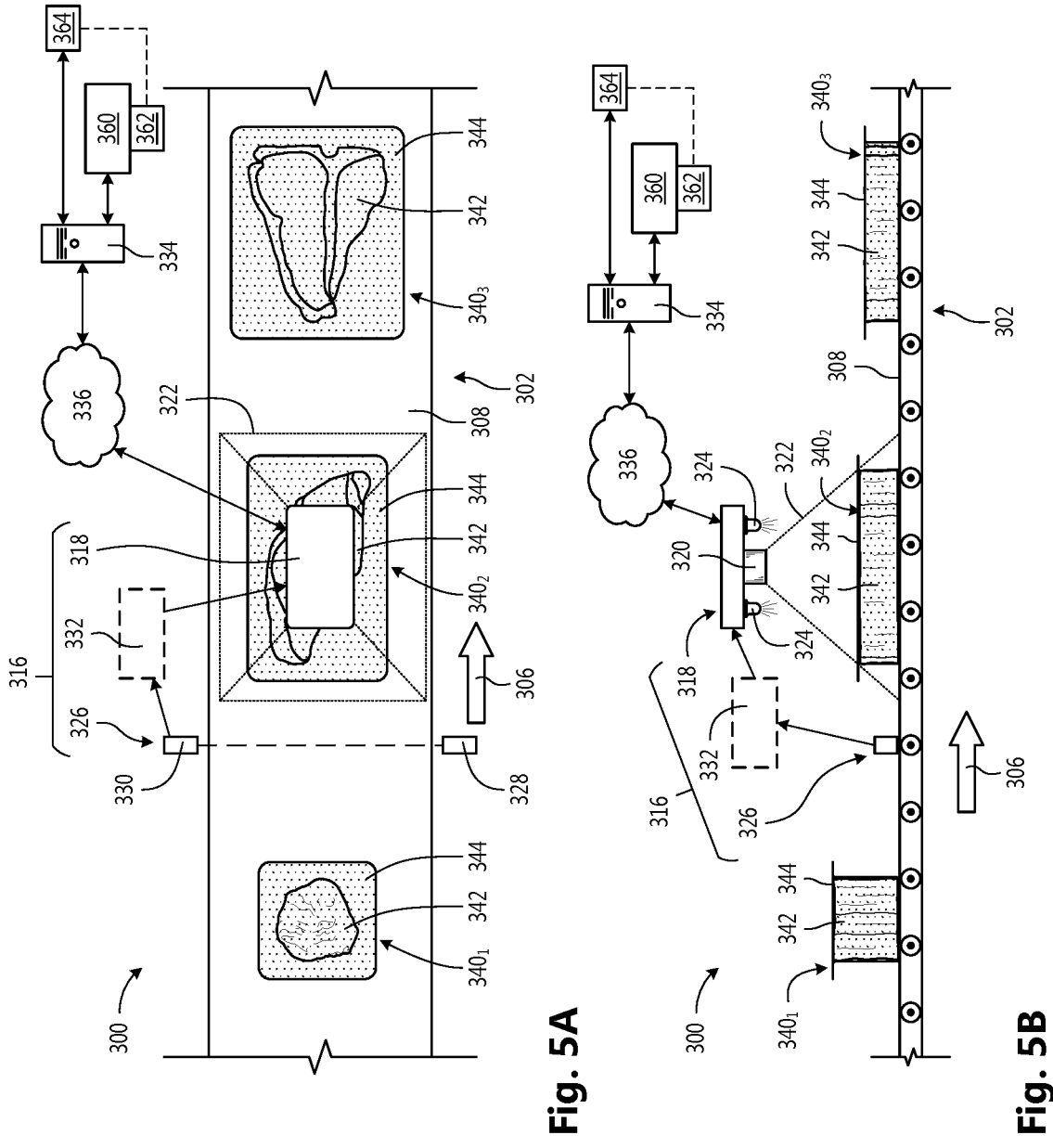
FIGS. 5A and 5B depict top and side views of the system shown in FIGS. 4A and 4B for obtaining images of a different type of meat products, in accordance with the embodiments disclosed herein.

Depicted in FIGS. 5A and 5B are top and side views of the system 300 being used with meat products that are pieces of meat located in packaging materials. In particular, FIGS. 5A and 5B depict meat products 340$_1$, 340$_2$, and 340$_3$ (collectively, meat products 340). Each of the meat products 340 includes a piece of meat 342 and a vacuum-sealed package 344 around the piece of meat 342. The meat products 340 are located on the transportation system 302 just like the meat products 304 in FIGS. 4A and 4B. However, because the meat products 340 include the vacuum-sealed package 344, at least a portion of the vacuum-sealed package 344 is at least partially transparent. In the depicted embodiment, the portion of the vacuum-sealed package 344 that abuts the upper surface of the pieces of meat 342 is at least partially transparent. This allows the image capture system 318 to capture images of the upper surfaces of the pieces of meat 342 through the vacuum-sealed package 344.

After the image capture system 318 captures an image of the upper surface of one of the pieces of meat 342 and sends the image to the computing device 334, the computing device 334 can determine, from the image of the surface of the meat product 340, a target region on the surface of the meat product 340 based on an estimated fat content in the meat product 340 at the target region on the surface of the meat product 340. In this case, the computing device 334 determines a target region on the vacuum-sealed package 344 based on the estimated fat content in the surface of the piece of meat 342 shown in the image. The computing device 334 can cause the movement system 360 to move the engagement tool 362 with respect to the meat product 340 such that the suction device of the engagement tool 362 engages the target region on the surface of the vacuum-sealed package 344 of the meat product 340.

Figures 6A, 6B:
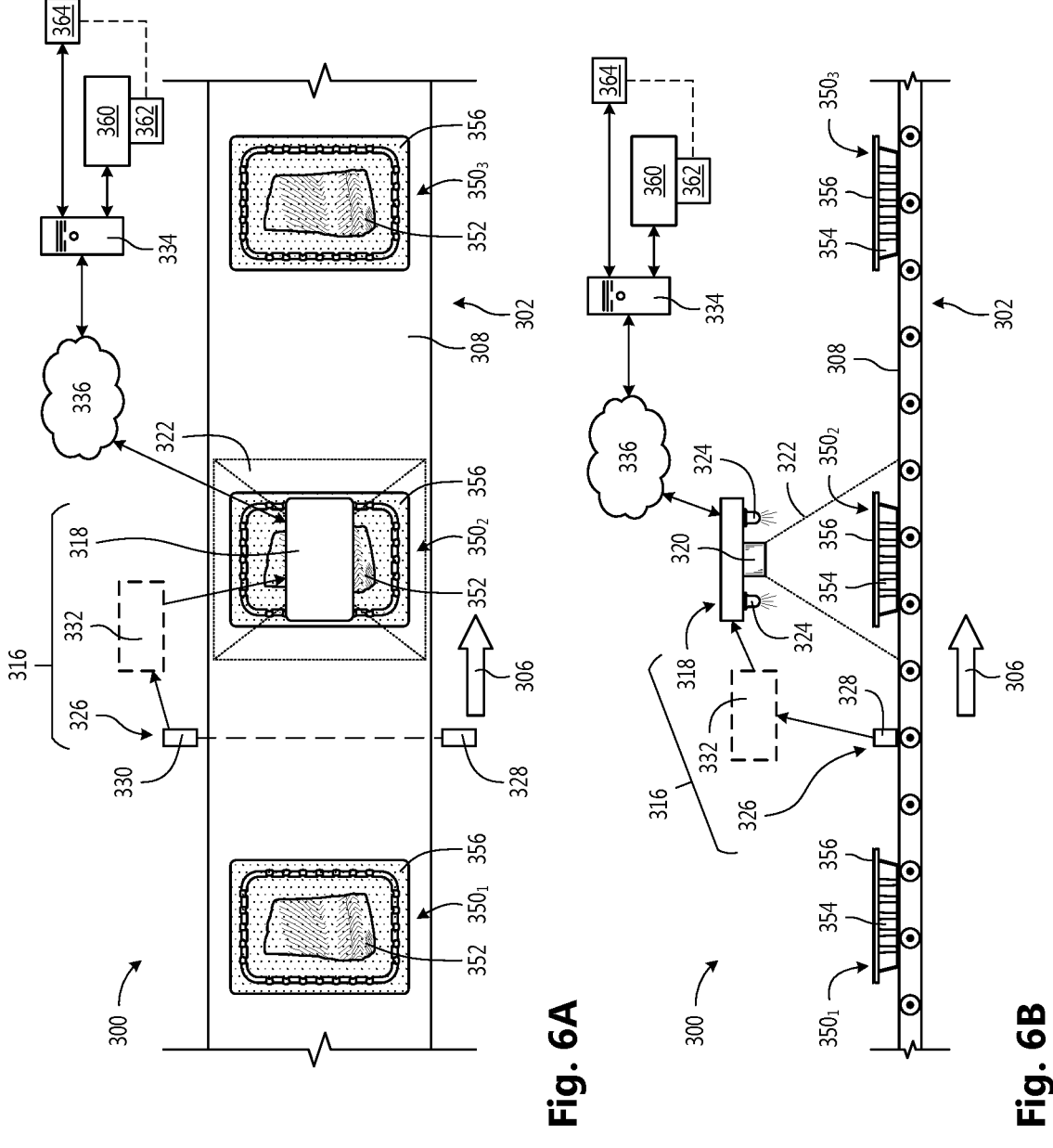
FIGS. 6A and 6B depict top and side views of the system shown in FIGS. 4A and 4B for obtaining images of a different type of meat products, in accordance with the embodiments disclosed herein.

Depicted in FIGS. 6A and 6B are top and side views of the system 300 being used with meat products that are pieces of meat located in packaging materials. In particular, FIGS. 6A and 6B depict meat products 350$_1$, 350$_2$, and 350$_3$ (collectively, meat products 350). Each of the meat products 350 includes a piece of meat 352 in a package that includes a tray 354 and a plastic film 356 sealed across an opening of the tray over the piece of meat 352. In some embodiments, the plastic film 356 is vacuum-sealed to the piece of meat 352 and the tray 354. The meat products 350 are located on the transportation system 302 just like the meat products 304 in FIGS. 4A and 4B. However, because the meat products 350 include the tray 354 and the film 356, at least a portion of the tray and/or the film 356 is at least partially transparent. In the depicted embodiment, the tray 354 is substantially opaque and at least a portion of the film 356 is at least partially transparent. This allows the image capture system 318 to capture images of the upper surfaces of the pieces of meat 352 through the film 356.

After the image capture system 318 captures an image of the upper surface of one of the pieces of meat 352 and sends the image to the computing device 334, the computing device 334 can determine, from the image of the surface of the meat product 350, a target region on the surface of the meat product 350 based on an estimated fat content in the meat product 350 at the target region on the surface of the meat product 350. In this case, the computing device 334 determines a target region on the film 356 based on the estimated fat content in the surface of the piece of meat 352 shown in the image. The computing device 334 can cause the movement system 360 to move the engagement tool 362 with respect to the meat product 350 such that the suction device of the engagement tool 362 engages the target region on the surface of the film 356 of the meat product 350.

It will be apparent that many other variations of meat products could be used with the system 300. For example, the meat products could include any type of meat product, such as beef, chicken, turkey, pork, fish, and the like. In another example, the meat products could have any type of packaging material around pieces of meat. In another example, each meat product could have multiple pieces of meat with packaging material around the multiple pieces of meat. In another example, the surface of the piece of meat in the captured image could be any surface of the meat product that will be engaged by the engagement tool. Any other variation of meat product is possible and can be handled by the systems described here.

Figure 7:
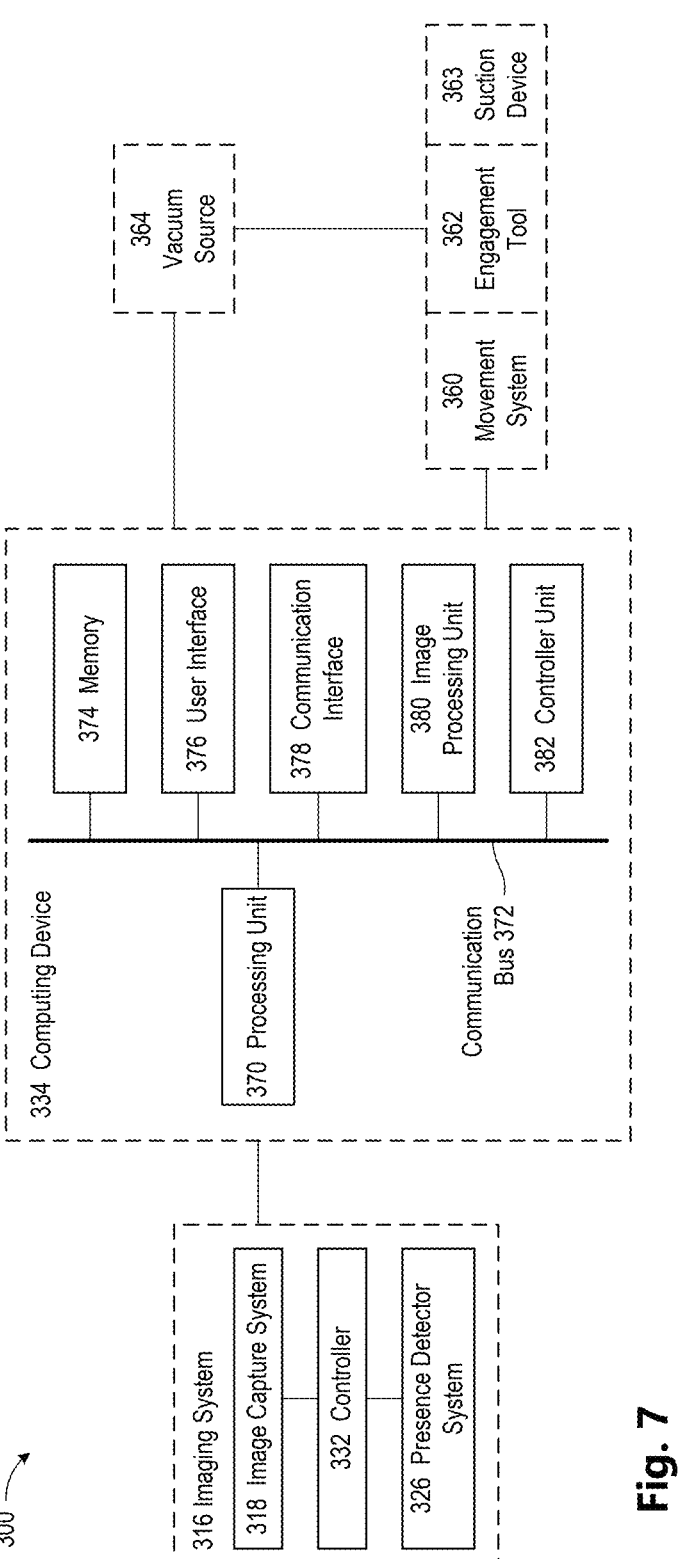
FIG. 7 depicts a schematic diagram of the system shown in FIGS. 4A and 4B, in accordance with the embodiments disclosed herein.

Depicted in FIG. 7 is a schematic diagram of the system 300. The system 300 includes the imaging system 316, the computing device 334, the movement system 360, the engagement tool 362, a suction device 363, and the vacuum source 364. The imaging system 316 is configured to capture images of meat products and to provide captured images to the computing device 334. The imaging system 316 includes the image capture system 318 configured to capture the image (e.g., still image or video) of the meat products. The imaging system 316 also includes the presence detector system 326 configured to detect a presence of individual meat products. For example, the presence detector system 326 may detect a presence of individual meat products as the meat products are transported by a transportation system. The imaging system 316 also includes the controller 332 configured to control a timing of the image capture by the image capture system 318 based on signals from the presence detector system 326.

The computing device 334 includes a processing unit 370, such as a central processing unit (CPU). The processing unit is communicatively coupled to a communication bus 372. In the depicted embodiment, the computing device 334 also includes memory 374 configured to store data at the direction of the processing unit 370. In the depicted embodiment, the computing device 334 also includes a user interface 376 that includes one or more devices that are capable of receiving inputs from a user into the computing device 334 and/or outputting outputs from the computing device 334. In the depicted embodiment, the computing device 334 also includes a communication interface 378 that is capable of communicating with external computing devices and/or networks. In the depicted embodiment, the computing device 334 also includes a database 324 that is local to the computing device 334.

The computing device 334 further includes an image processing unit 380. The image processing unit 380 may be implemented as software being executed by the processing unit 370, as hardware, or as some combination thereof. The image processing unit 380 may be capable of analyzing images of meat products in any of the ways discussed herein. In one example, the image processing unit 380 may be able to determine a difference between a meat product and background sections in an image. In another example, the image processing unit 380 may be capable of identifying regions of the meat product, such as regions identified based on an estimated similarity of tissue content (e.g., fat content) in the regions. In another example, the image processing unit 380 may be capable of identifying an estimated fat content for each of the regions. In another example, the image processing unit 380 may be capable of determining a target region based on the estimated fat content in the regions. In another example, the image processing unit 380 may be capable of determining a target point within the target region.

The computing device 334 further includes a controller unit 382. The controller unit 382 may be implemented as software being executed by the processing unit 370, as hardware, or as some combination thereof. The controller unit 382 may be capable of controlling the computing device, the movement system 360, the vacuum source 364, and/or any other component of the system 300 in any of the ways discussed herein. In one example, the controller unit 382 may be capable of generating signals that cause the movement system 360 to move the engagement tool 362 with respect to the meat product such that the suction device 363 engages the target region on the surface of the meat product. In another example, the controller unit 382 may be capable of generating signals that cause the vacuum source 364 to initiate a vacuum within the suction device 363 (e.g., by drawing a vacuum in a vacuum manifold of the engagement tool 362) such that the engagement tool 362 exerts a force on the target region of the surface of the meat product at the suction device 363. In another example, the controller unit 382 may be capable of generating signals that control any other aspect of the system 300, such as the transportation system 302, the imaging system 316, and the like.

In the depicted embodiment, each of the memory 374, the user interface 376, the communication interface 378, the image processing unit 380, and the controller unit 382 is communicatively coupled to the communication bus 372 so that the processing unit 370, the memory 374, the user interface 376, the communication interface 378, the image processing unit 380, and the image processing unit 380 are capable of communicating with each other.

As noted above, the imaging system 316 is configured to provide the computing device 334 with images of the meat products. The images from the imaging system 316 to the computing device 334 may be communicated via one or more wired connections (e.g., a serial communication connection), wireless connections (e.g., a WiFi connection), or a combination of wired and wireless connections. Upon the computing device 334 receiving an image of a meat product from the imaging system 316, the processing unit 370 may cause the image to be stored in the memory 374. The processing unit 370 may then instruct the trained image processing unit to process the image. The processing unit 370 may then cause the controller unit 382 to control the movement system 360, the vacuum source 364, or any other component of the system 300 based on the processed image.

Figure 8:
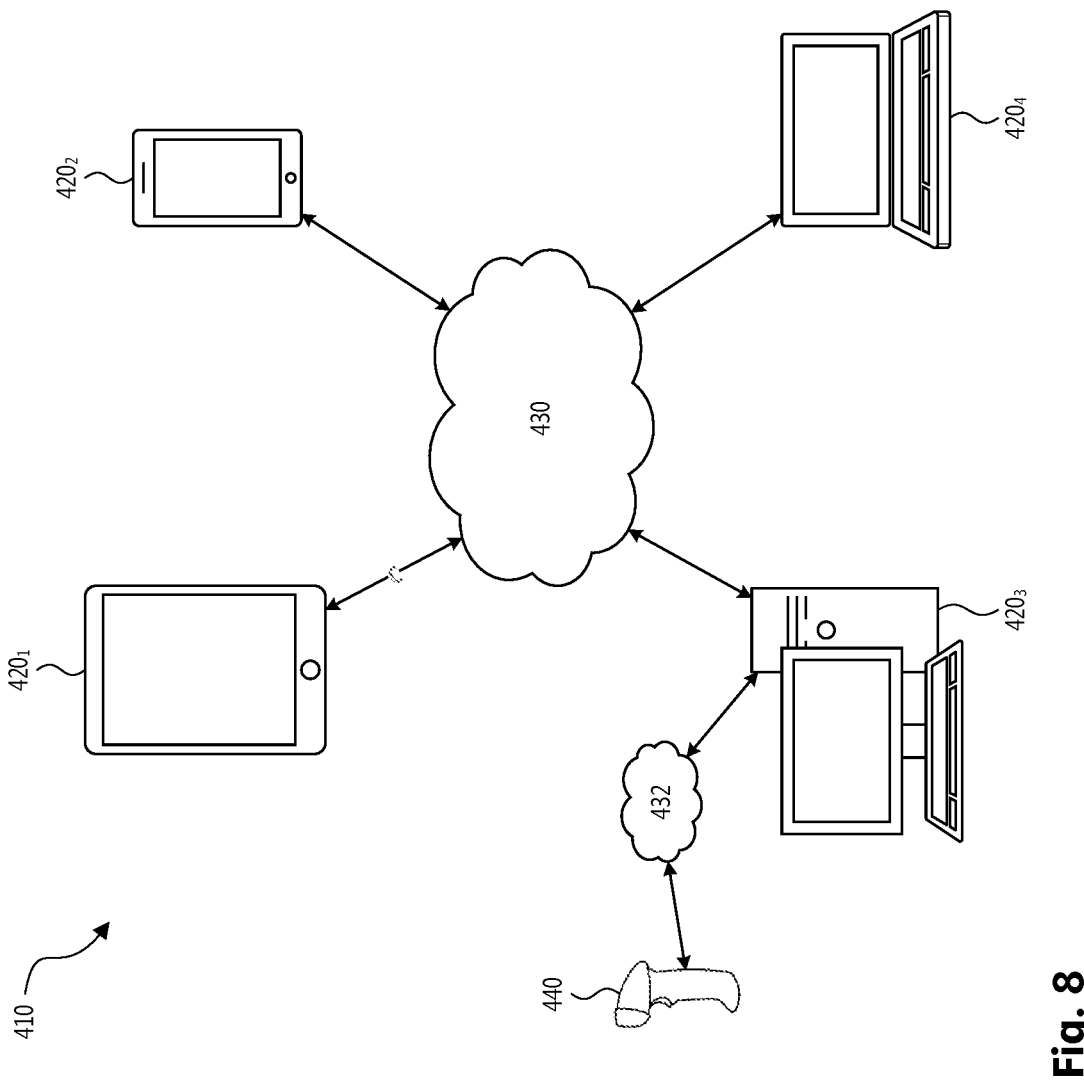
FIG. 8 depicts an example embodiment of a system that may be used to implement some or all of the embodiments described herein.

FIG. 8 depicts an example embodiment of a system 410 that may be used to implement some or all of the embodiments described herein. In the depicted embodiment, the system 410 includes computing devices 420₁, 420₂, 420₃, and 420₄ (collectively computing devices 420). In the depicted embodiment, the computing device 420₁ is a tablet, the computing device 420₂ is a mobile phone, the computing device 420₃ is a desktop computer, and the computing device 420₄ is a laptop computer. In other embodiments, the computing devices 420 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 420 are communicatively coupled to each other via one or more networks 430 and 432. Each of the networks 430 and 432 may include one or more wired or wireless networks (e.g., a 3G network, the Internet, an internal network, a proprietary network, a secured network). The computing devices 420 are capable of communicating with each other and/or any other computing devices via one or more wired or wireless networks. While the particular system 410 in FIG. 8 depicts that the computing devices 420 communicatively coupled via the network 430 include four computing devices, any number of computing devices may be communicatively coupled via the network 430.

In the depicted embodiment, the computing device 420₃ is communicatively coupled with a peripheral device 440 via the network 432. In the depicted embodiment, the peripheral device 440 is a scanner, such as a barcode scanner, an optical scanner, a computer vision device, and the like. In some embodiments, the network 432 is a wired network (e.g., a direct wired connection between the peripheral device 440 and the computing device 420₃), a wireless network (e.g., a Bluetooth connection or a WiFi connection), or a combination of wired and wireless networks (e.g., a Bluetooth connection between the peripheral device 440 and a cradle of the peripheral device 440 and a wired connection between the peripheral device 440 and the computing device 420₃). In some embodiments, the peripheral device 440 is itself a computing device (sometimes called a "smart" device). In other embodiments, the peripheral device 440 is not a computing device (sometimes called a "dumb" device).

Figure 9:
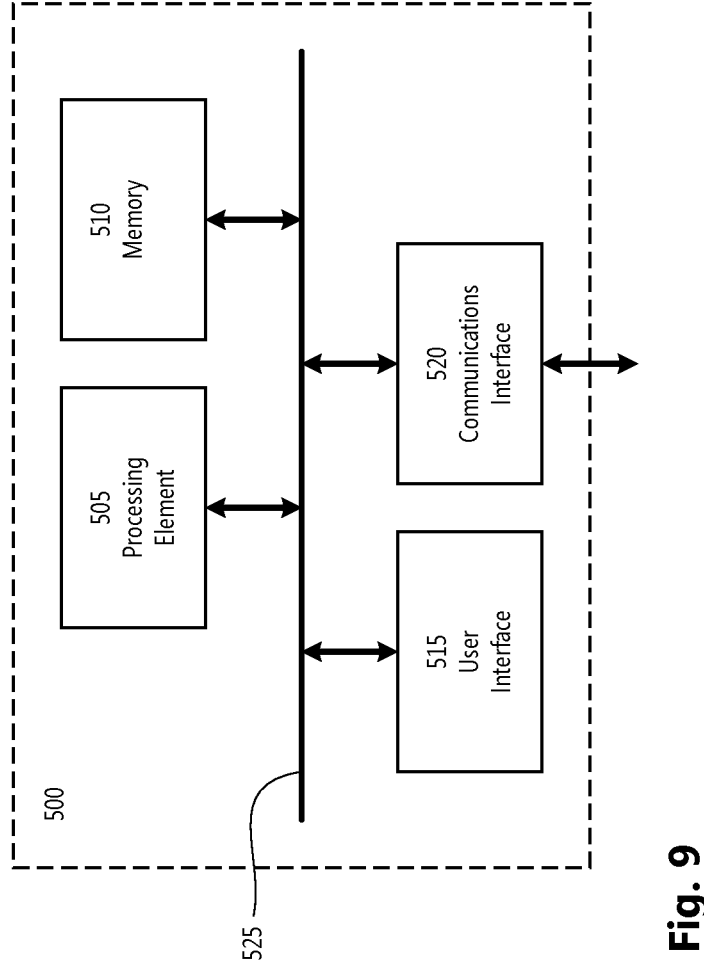
FIG. 9 depicts a block diagram of an embodiment of a computing device, in accordance with the embodiments described herein.

Depicted in FIG. 9 is a block diagram of an embodiment of a computing device 500. Any of the computing devices 420 and/or any other computing device described herein may include some or all of the components and features of the computing device 500. In some embodiments, the computing device 500 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 500 includes a processing element 505, memory 510, a user interface 515, and a communications interface 520. The processing element 505, memory 510, a user interface 515, and a communications interface 520 are capable of communicating via a communication bus 525 by reading data from and/or writing data to the communication bus 525. The computing device 500 may include other components that are capable of communicating via the communication bus 525. In other embodiments, the computing device does not include the communication bus 525 and the components of the computing device 500 are capable of communicating with each other in some other way.

The processing element 505 (also referred to as one or more processors, processing circuitry, and/or similar terms used herein) is capable of performing operations on some external data source. For example, the processing element may perform operations on data in the memory 510, data receives via the user interface 515, and/or data received via the communications interface 520. As will be understood, the processing element 505 may be embodied in a number of different ways. In some embodiments, the processing element 505 includes one or more complex programmable logic devices (CPLDs), microprocessors, multi-core processors, co processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 505 is configured for a particular use or configured to execute instructions stored in volatile or nonvolatile media or otherwise accessible to the processing element 505. As such, whether configured by hardware or computer program products, or by a combination thereof, the processing element 505 may be capable of performing steps or operations when configured accordingly.

The memory 510 in the computing device 500 is configured to store data, computer-executable instructions, and/or any other information. In some embodiments, the memory 510 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random access memory (NVRAM), magneto-resistive random access memory (MRAM), resistive random-access memory (RRAM), Silicon Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 510 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity relationship model, object model, document model, semantic model, graph model, or any other model.

The user interface 515 of the computing device 500 is in communication with one or more input or output devices that are capable of receiving inputs into and/or outputting any outputs from the computing device 500. Embodiments of input devices include a keyboard, a mouse, a touchscreen display, a touch sensitive pad, a motion input device, movement input device, an audio input, a pointing device input, a joystick input, a keypad input, peripheral device 440, foot switch, and the like. Embodiments of output devices include an audio output device, a video output, a display device, a motion output device, a movement output device, a printing device, and the like. In some embodiments, the user interface 515 includes hardware that is configured to communicate with one or more input devices and/or output devices via wired and/or wireless connections.

The communications interface 520 is capable of communicating with various computing devices and/or networks. In some embodiments, the communications interface 520 is capable of communicating data, content, and/or any other information, that can be transmitted, received, operated on, processed, displayed, stored, and the like. Communication via the communications interface 520 may be executed using a wired data transmission protocol, such as fiber distributed data interface (FDDI), digital subscriber line (DSL), Ethernet, asynchronous transfer mode (ATM), frame relay, data over cable service interface specification (DOC-SIS), or any other wired transmission protocol. Similarly, communication via the communications interface 520 may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 500 may be located remotely from other components of the computing device 500 components, such as in a distributed system. Furthermore, one or more of the components may be combined and additional components performing functions described herein may be included in the computing device 500. Thus, the computing device 500 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A system comprising:

an engagement tool having a suction device; a movement system configured to move the engagement tool;

an imaging system configured to capture an image of a surface of a meat product; and a computing device communicatively coupled to the movement system and the imaging system, wherein the computing device is configured to:

determine, from the image of the surface of the meat product, a target region on the surface of the meat product based on an estimated fat content in the meat product at the target region on the surface of the meat product, cause the movement system to move the engagement tool with respect to the meat product such that the suction device engages the target region on the surface of the meat product, initiate a vacuum within the suction device such that the engagement tool exerts a force on the target region of the surface of the meat product at the suction device, and cause the movement system to move the meat product while the engagement tool exerts a force on the target region of the surface of the meat product at the suction device;

wherein the meat product includes a piece of raw meat in a package, wherein the package is at least partially transparent, and wherein the surface of the meat product includes a surface of the package.

2. The system of claim 1, wherein the estimated fat content in the meat product at the target region on the surface of the meat product is above a predetermined level of fat content.

3. The system of claim 2, wherein the predetermined level of fat content is an estimated average fat content of the surface of the meat product.

4. The system of claim 1, wherein the estimated fat content in the meat product at the target region on the surface of the meat product is a highest estimated fat content on the surface of the meat product.

5. The system of claim 1, wherein the computing device, as part of determining the target region on the surface of the meat product, is configured to determine a target point in the target region on the surface of the meat product.

6. The system of claim 1, wherein the package includes at least one of a closed bag made from a plastic film, a vacuum-sealed bag made from plastic film, or a vacuum-seal packaging having a tray and a plastic film sealed across an opening of the tray.

7. The system of claim 1, wherein the surface of the meat product is an upper surface of the meat product.

8. The system of claim 1, wherein the imaging system is configured to capture the image of the surface of the meat product while the meat product is on a transportation system.

9. The system of claim 1, wherein the movement system includes a robotic arm configured to move the engagement tool within a three-dimensional space.

10. The system of claim 9, wherein the robotic arm is further configured to rotate the engagement tool with respect to the meat product to provide an angular alignment of the engagement tool with respect to the meat product.

11. The system of claim 1, wherein the engagement tool has a plurality of suction devices that includes the suction device and a second suction device.

12. The system of claim 11, wherein the computing device is further configured to determine, from the image of the surface of the meat product, a second target region on the surface of the meat product based on the estimated fat content in the meat product at the target region on the surface of the meat product.

13. The system of claim 12, wherein, when the controller causes the movement system to move the engagement tool with respect to the meat product such that the suction device engages the target region on the surface of the meat product, the controller is further configured to cause the movement system to move the engagement tool with respect to the meat product such that the second suction device engages the second target region on the surface of the meat product.

14. The system of claim 13, wherein the controller is further configured to cause the movement system to rotate the engagement tool with respect to the meat product to provide an angular alignment of the engagement tool with respect to the meat product before the suction device engages the target region and the second suction device engages the second target region.

15. The system of claim 1, wherein the estimated fat content in the meat product at the target region is based on one or more of an estimate of the thickness of fat content, a calculated surface area of fat content, or contouring of fat content.

16. A method of controlling a system that includes an engagement tool having a suction device and a movement system configured to move the engagement tool, the method comprising:

capturing, by an imaging system, an image of a surface of a meat product;

determining, by a computing device, a target region on the surface of the meat product from the image of the surface of the meat product based on an estimated fat content in the meat product at the target region on the surface of the meat product;

causing, by the computing device, a movement system to move the engagement tool with respect to the meat product such that the suction device engages the target region on the surface of the meat product;

initiating, by the computing device, a vacuum within the suction device such that the engagement tool exerts a force on the target region of the surface of the meat product at the suction device; and moving, by the movement system, the meat product while the engagement tool exerts a force on the target region of the surface of the meat product at the suction device;

wherein the meat product includes a piece of raw meat in a package, wherein the package is at least partially transparent, and wherein the surface of the meat product includes a surface of the package.

17. The method of claim 16, wherein the estimated fat content in the meat product at the target region on the surface of the meat product is above a predetermined level of fat content.

18. The method of claim 16, wherein the surface of the meat product is an upper surface of the meat product.

19. The method of claim 16, wherein the imaging system is configured to capture the image of the surface of the meat product while the meat product is on a transportation system.

* * * * *